(12) United States Patent
Nabi et al.

(10) Patent No.: US 11,816,188 B2
(45) Date of Patent: Nov. 14, 2023

(54) WEAKLY SUPERVISED ONE-SHOT IMAGE SEGMENTATION

(71) Applicant: SAP SE, Walldorf (DE)

(72) Inventors: Moin Nabi, Berlin (DE); Tassilo Klein, Berlin (DE); Hasnain Raza, Berlin (DE); Sayyed Mahdyar Ravanbakhsh, Berlin (DE)

(73) Assignee: SAP SE, Walldorf (DE)

( * ) Notice: Subject to any disclaimer, the term of this patent is extended or adjusted under 35 U.S.C. 154(b) by 408 days.

(21) Appl. No.: 17/008,615

(22) Filed: Aug. 31, 2020

(65) Prior Publication Data
US 2022/0067455 A1 Mar. 3, 2022

(51) Int. Cl.
*G06F 18/2413* (2023.01)
*G06T 7/11* (2017.01)
*G06N 20/00* (2019.01)
*G06N 5/04* (2023.01)
*G06F 18/214* (2023.01)
*G06F 18/21* (2023.01)

(52) U.S. Cl.
CPC ...... *G06F 18/24143* (2023.01); *G06F 18/214* (2023.01); *G06F 18/217* (2023.01); *G06N 5/04* (2013.01); *G06N 20/00* (2019.01); *G06T 7/11* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2018/0129912 | A1* | 5/2018 | Vernaza | G06N 3/084 |
| 2019/0171906 | A1* | 6/2019 | Sodhani | G06F 16/583 |
| 2020/0401854 | A1* | 12/2020 | Peng | G06K 9/6259 |
| 2021/0248427 | A1* | 8/2021 | Guo | G06V 10/764 |
| 2021/0374453 | A1* | 12/2021 | Kuo | G06V 10/25 |

(Continued)

OTHER PUBLICATIONS

Caelles, S, et al., "One-shot video object segmentation," In CVPR 2017. IEEE, 2017.

(Continued)

*Primary Examiner* — Wen W Huang
(74) *Attorney, Agent, or Firm* — Mintz Levin Cohn Ferris Glovsky and Popeo, P.C.

(57) ABSTRACT

A machine learning model may be trained based on a training set including training images depicting various base objects. Each training images may be associated with a ground-truth segmentation corresponding to one or more pixel-wise labels. The machine learning model may be trained to learn base class prototypes corresponding to segmentations of classes of similar base objects. The machine learning model may be further trained based on a support image depicting a novel object. The support image may be associated with an image-level label corresponding to the novel object. The machine learning model may be trained to learn, based on a base class prototype identified as being similar to the support image, a novel class prototype corresponding to the novel object. The trained machine learning model to may be applied to segment a query image. Related systems and computer program products are also provided.

17 Claims, 6 Drawing Sheets

(56) References Cited

U.S. PATENT DOCUMENTS

2022/0027672 A1* 1/2022 Xu ..................... G06K 9/6256

OTHER PUBLICATIONS

Donahue, J. et al., "Decaf: A deep convolutional activation feature for generic visual recognition." In International conference on machine learning, pp. 647-655, 2014.

Dong, N. et al., "Few-shot semantic segmentation with prototype learning." In BMVC, vol. 3, 2018.

Everingham, M. et al., "The PASCAL Visual Object Classes (voc) challenge." International Journal of Computer Vision, 88(2):303-338, Jun. 2010.

Fu, K.-S. et al., "A survey on image segmentation." Pattern recognition, vol. 13 1981.

Hariharan, B. et al., "Low-shot visual recognition by shrinking and hallucinating features." In ICCV, pp. 3037-3046, 2017.

Hariharan, B. et al., "Simultaneous detection and segmentation." In European Conference on Computer Vision, pp. 297-312. Springer, 2014.

Hong, S. et al., "Learning transferrable knowledge for semantic segmentation with deep convolutional neural network." In Proceedings of the IEEE Con-ference on Computer Vision and Pattern Recognition, pp. 3204-3212, 2016.

Hu, R. et al., "Learning to segment everything." In Proceedings of the IEEE Conference on Computer Vision and Pattern Recognition, pp. 4233-4241, 2018.

Koch, G. et al., "Siamese neural networks for one-shot image recognition." In *ICML Deep Learning Workshop*, vol. 2, 2015.

Long, J. et al., "Fully convolutional networks for semantic segmentation." In Proceedings of the IEEE conference on computer vision and pattern recognition, pp. 3431-3440, 2015.

Michaelis, C. et al., "One-shot instance segmentation." arXiv preprint arXiv:1811.11507, 2018.

Michaelis, C. et al., "One-shot segmentation in clutter." arXiv preprint arXiv: 1803.09597, 2018.

Papandreou, G. et al., "Weakly-and semi-supervised learning of a dcnn for semantic image segmentation." arXiv preprint arXiv:1502.02734, 2015.

Pham, T. et al., "Bayesian semantic instance segmentation in open set world." In Proceedings of the European Conference on Computer Vision (ECCV), pp. 3-18, 2018.

Qiao, S. et al., "Few-shot image recognition by predicting parameters from activations." In Proceedings of the IEEE Conference on Computer Vision and Pattern Recognition, pp. 7229-7238, 2018.

Rakelly, K. et al., "Conditional networks for few-shot semantic segmentation." ICLR, 2018.

Ravanbakhsh, M. et al., "Cnn-aware binary map for general semantic segmentation." In Image Processing (ICIP), 2016 IEEE International Conference on, pp. 1923-1927. IEEE, 2016.

Ren, M. et al., "Meta-learning for semi-supervised few-shot classification." arXiv preprint arXiv:1803.00676, 2018.

Shaban, A. et al., "One-shot learning for semantic segmentation." arXiv preprint arXiv:1709.03410, 2017.

Sharif Razavian, A. et al., "Cnn features off-the-shelf: an astounding baseline for recognition." In Proceedings of the IEEE conference on computer vision and pattern recognition workshops, pp. 806-813, 2014.

Snell, J. et al., "Prototypical networks for few-shot learning." In Advances in Neural Information Processing Systems, pp. 4077-4087, 2017.

Vinyals, O. et al., "Matching networks for one shot learning." In Advances in Neural Information Processing Systems, pp. 3630-3638, 2016.

Wang, X. et al., "Weakly-supervised semantic segmentation by iteratively mining common object features." In Proceedings of the IEEE Conference on Computer Vision and Pattern Recognition, pp. 1354-1362, 2018.

Zhang, X. et al., "SG-One: Similarity guidance network for one-shot semantic segmentation." arXiv preprint arXiv:1810.09091, 2018.

* cited by examiner

WEAKLY SUPERVISED ONE-SHOT IMAGE SEGMENTATION

TECHNICAL FIELD

The subject matter described herein relates generally to machine learning and more specifically to weakly supervised one-shot image segmentation.

BACKGROUND

Machine learning models may be trained to perform a variety of cognitive tasks. A machine learning model trained to perform image segmentation in which the machine learning model partitions an image into one or more segments, each of which corresponding to an object depicted in the image. For example, the machine learning model may be trained to partition the image into one or more sets of pixels including by assigning, to each pixel in the image, a label indicating whether the pixel forms a portion of an object depicted in the image. Training the machine learning model to perform image segmentation may include adjusting the machine learning model to minimize the errors present in the output of the machine learning model. For instance, the machine learning model may be trained by at least adjusting the weights applied by the machine learning model in order to minimize a quantity of incorrectly labeled pixels in the output of the machine learning model.

SUMMARY

Systems, methods, and articles of manufacture, including computer program products, are provided for weakly supervised, one-shot image segmentation. In some example embodiments, there is provided a system that includes at least one processor and at least one memory. The at least one memory may include program code that provides operations when executed by the at least one processor. The operations may include: training, in a supervised manner, a machine learning model to learn a plurality of base class prototypes corresponding to a plurality of base objects, each of the plurality of base class prototypes corresponding to a segmentation of a class of one or more similar base objects; training, based at least on a support image depicting a novel object, the machine learning model to learn a novel class prototype corresponding to the novel object, the machine learning model being trained to learn the novel class prototype based at least on one of the plurality of base class prototypes identified as being similar to the support image, and the novel object being a different object than the plurality of base objects; and applying the trained machine learning model to segment a query image.

In some variations, one or more features disclosed herein including the following features can optionally be included in any feasible combination. A nearest neighbor search may be performed in order to identify the one of the plurality of base class prototypes similar to the support image.

In some variations, the one of the plurality of base class prototypes may be identified based at least on a similarity between a corresponding class of base objects and the novel object depicted in the support image.

In some variations, the machine learning model may be trained, based at least on a plurality of training images, to learn the plurality of base class prototypes. Each of the plurality of training images may depict one of the plurality of base objects. Each of the plurality of training images may be associated with a ground-truth segmentation corresponding to one or more pixel-wise labels.

In some variations, the query image may depict the novel object. The machine learning model may segment, based at least on a proposed segmentation corresponding to the novel class prototype, the query image.

In some variations, the query image may depict one of the plurality of base objects. The machine learning model may segment, based at least on a proposed segmentation corresponding to a corresponding one of the plurality of base class prototypes, the query image.

In some variations, the machine learning model may be a neural network.

In some variations, the machine learning model may be trained to learn the novel class prototype based on a single support image.

In some variations, the support image may be associated with an image-level label corresponding to the novel object instead of a plurality of pixel-wise labels.

In some variations, the machine learning model may segment the query image by at least assigning, to each pixel in the query image, a label indicating whether the pixel forms a portion of an object depicted in the query image.

In another aspect, there is provided a method for weakly supervised, one-shot image segmentation. The method may include: training, in a supervised manner, a machine learning model to learn a plurality of base class prototypes corresponding to a plurality of base objects, each of the plurality of base class prototypes corresponding to a segmentation of a class of one or more similar base objects; training, based at least on a support image depicting a novel object, the machine learning model to learn a novel class prototype corresponding to the novel object, the machine learning model being trained to learn the novel class prototype based at least on one of the plurality of base class prototypes identified as being similar to the support image, and the novel object being a different object than the plurality of base objects; and applying the trained machine learning model to segment a query image.

In some variations, one or more features disclosed herein including the following features can optionally be included in any feasible combination. The method may further comprise performing a nearest neighbor search in order to identify the one of the plurality of base class prototypes similar to the support image.

In some variations, the one of the plurality of base class prototypes may be identified based at least on a similarity between a corresponding class of base objects and the novel object depicted in the support image.

In some variations, the machine learning model may be trained, based at least on a plurality of training images, to learn the plurality of base class prototypes. Each of the plurality of training images may depict one of the plurality of base objects. Each of the plurality of training images may be associated with a ground-truth segmentation corresponding to one or more pixel-wise labels.

In some variations, the query image may depict the novel object. The machine learning model may segment, based at least on a proposed segmentation corresponding to the novel class prototype, the query image.

In some variations, the query image may depict one of the plurality of base objects. The machine learning model may segment, based at least on a proposed segmentation corresponding to a corresponding one of the plurality of base class prototypes, the query image.

In some variations, the machine learning model may be a neural network.

In some variations, the machine learning model may be trained to learn the novel class prototype based on a single support image.

In some variations, the support image may be associated with an image-level label corresponding to the novel object instead of a plurality of pixel-wise labels. The machine learning model may segment the query image by at least assigning, to each pixel in the query image, a label indicating whether the pixel forms a portion of an object depicted in the query image.

In another aspect, there is provided a computer program product including a non-transitory computer readable medium storing instructions. The instructions may cause operations may executed by at least one data processor. The operations may include: training, in a supervised manner, a machine learning model to learn a plurality of base class prototypes corresponding to a plurality of base objects, each of the plurality of base class prototypes corresponding to a segmentation of a class of one or more similar base objects; training, based at least on a support image depicting a novel object, the machine learning model to learn a novel class prototype corresponding to the novel object, the machine learning model being trained to learn the novel class prototype based at least on one of the plurality of base class prototypes identified as being similar to the support image, and the novel object being a different object than the plurality of base objects; and applying the trained machine learning model to segment a query image.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
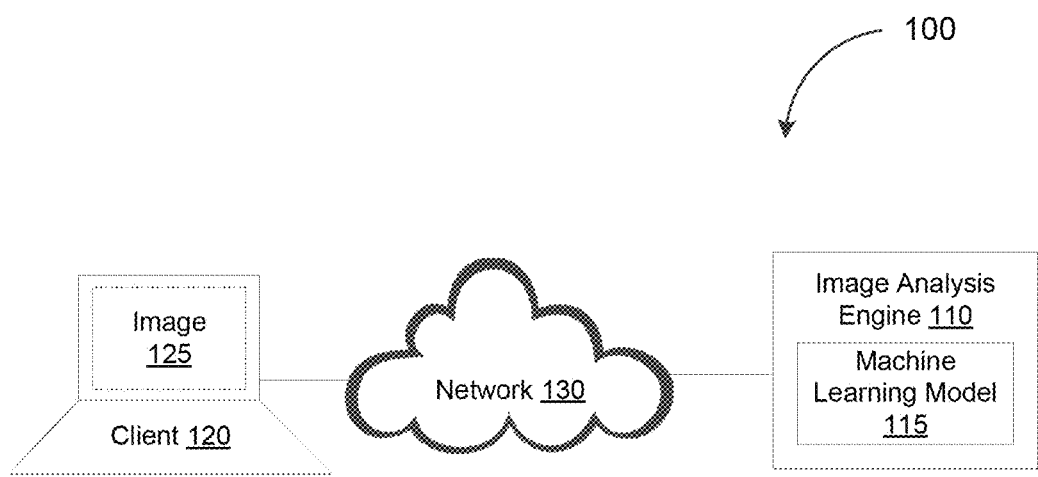
FIG. 1 depicts a system diagram illustrating a machine learning enabled image analysis system, in accordance with some example embodiments.

A machine learning model may be trained to perform an image analysis task by at least subjecting the machine learning model to supervised learning. For example, the machine learning model may be trained to perform image segmentation, which may include assigning, to each pixel in an image, one or more labels indicating whether each pixel forms a portion of one or more objects depicted in the image. Training the machine learning model to perform image segmentation with optimal performance may require a large corpus of labeled training samples. For instance, the corpus of training samples may include numerous images depicting a gamut of different objects. Moreover, each training sample may include an image in which every pixel have been assigned a label corresponding to a ground truth segmentation of the image. Generating a sufficiently large corpus of labeled training samples to train the machine learning model to perform image segmentation may therefore require excessive resources. Accordingly, training the machine learning model to perform image segmentation in a supervised manner may often be impracticable.

In some example embodiments, a machine learning controller may train a machine learning model, for example, a neural network such as a fully convolutional network (FCN), to perform weakly supervised, one-shot image segmentation. For example, the machine learning model may be trained, based on one or more training images, to generate segmentations of various base objects depicted in the one or more training images. For a class of similar base objects depicted in the training images, the machine learning model may generate a base class prototype corresponding to a segmentation for those base objects. The trained machine learning model may subsequently be deployed to segment, based on a support image depicting a novel object, one or more query images depicting the novel object and/or a base object. For instance, the machine learning model may segment the support image by generating, based at least on a segmentation of one or more similar base objects, a segmentation of the novel object depicted in the support image. The segmentation of the novel object depicted in the support image may serve as a proposed segmentation when the machine learning model segments the one or more query images. The machine learning model may apply the proposed segmentation to perform non-generalized segmentation in which the query images depict only the novel object and/or generalized segmentation in which the query images may depict the novel object as well as a base object.

In some example embodiments, instead of a large corpus of training samples having pixel-wise labels, the pixel-wise labeled training samples used to train the machine learning model may be limited to training images depicting base objects. The volume and complexity of the training samples may be further minimized at least because only a single support image of each novel object may be required in order for the machine learning model to learn a novel class prototype to perform one-shot, weakly supervised image segmentation. Moreover, the support images used for one-shot, weakly supervised image segmentation may require less precise labels than the pixel-wise labels associated with the training images. For example, each support image may be associated with a more general class label identifying the novel object depicted in the support image instead of more precise pixel-wise labels identifying the pixels in the support image forming the novel object. As such, training the machine learning model 115 to perform one-shot, weakly supervised image segmentation may require less resources than training the machine learning model 115 to perform image segmentation in a fully supervised manner.

FIG. 1 depicts a system diagram illustrating an example of a machine learning enabled image analysis system 100, in accordance with some example embodiments. Referring to FIG. 1, the machine learning enabled image analysis system 100 may include a image analysis engine 110 and a client 120. The image analysis engine 110 and the client 120 may be communicatively coupled via a network 130. It should be appreciated that the client 120 may be a processor-based device including, for example, a smartphone, a tablet computer, a wearable apparatus, a virtual assistant, an Internet-of-Things (IoT) appliance, and/or the like. The network 130 may be any wired network and/or a wireless network including, for example, a wide area network (WAN), a local area network (LAN), a virtual local area network (VLAN), a public land mobile network (PLMN), the Internet, and/or the like.

The image analysis engine 110 may train a machine learning model 115, for example, a neural network such as a fully convolutional network (FCN), to perform an image analysis task. For example, the image analysis engine 110 may train the machine learning model 115 to perform, on an image 125 received from the client 120, image segmentation including by assigning, to each pixel in the image 125, one or more labels indicating whether each pixel forms a portion of one or more objects depicted in the image 125.

Training the machine learning model 115 to perform image segmentation in a fully supervised manner may require a large corpus of labeled training samples. For example, the corpus of training samples may include numerous images depicting a gamut of different objects. Moreover, each training sample may include an image in which every pixel have been assigned a label corresponding to a ground truth segmentation of the image. Accordingly, in some example embodiments, instead of training the machine learning model 115 to perform image segmentation in a fully supervised manner, the machine learning model 115 may be trained to segment one or more base objects (e.g., learn one or more base object prototypes) in a supervised manner before being deployed to perform one-shot, weakly supervised image segmentation on one or more query images depicting a novel object and/or a base object such as, for example, the image 510 received from the client 120. For example, as part of the one-shot, weakly supervised image segmentation, the machine learning model 115 may learn, based on a single support image depicting the novel object, a novel class prototype before applying the novel class prototype towards segmenting the one or more query images.

Figure 2A:
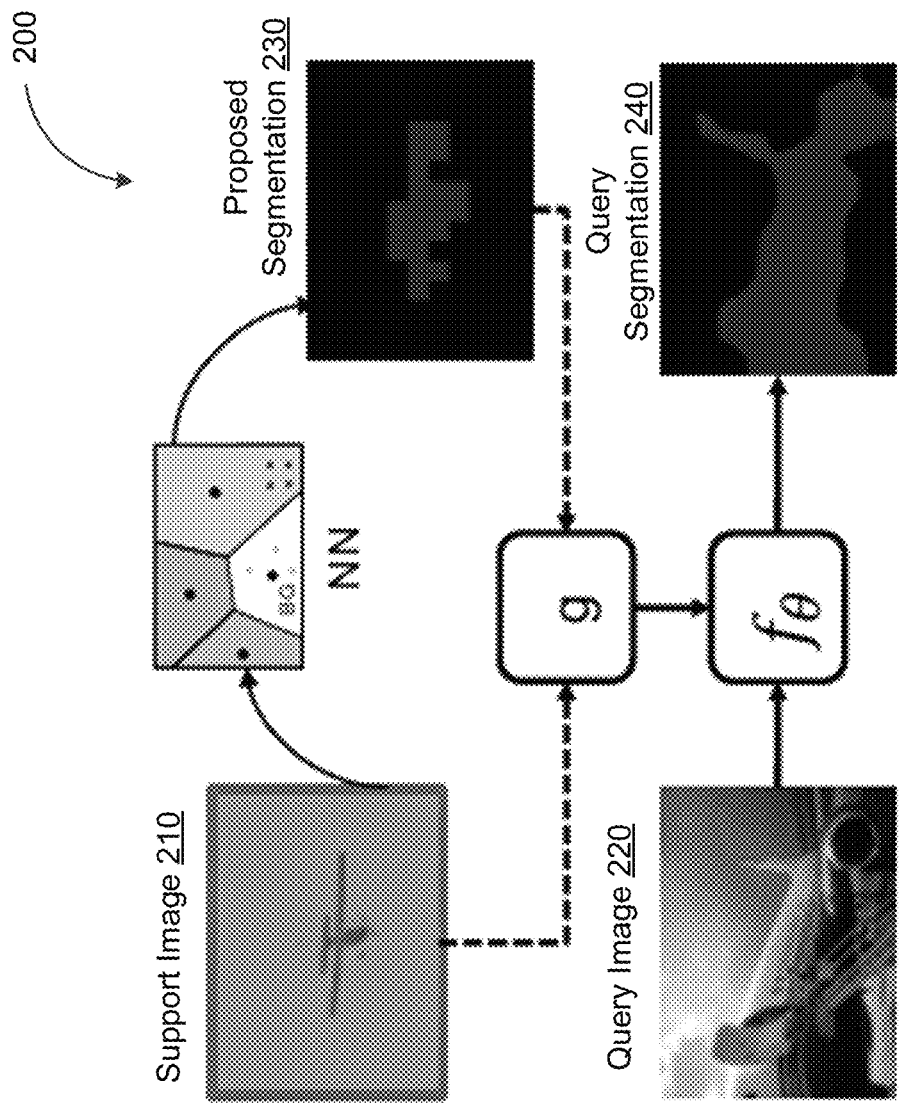
FIG. 2A depicts a schematic diagram illustrating an example of a process for weakly supervised training of a machine learning model to perform one-shot image segmentation, in accordance with some example embodiments.
Figure 2B:
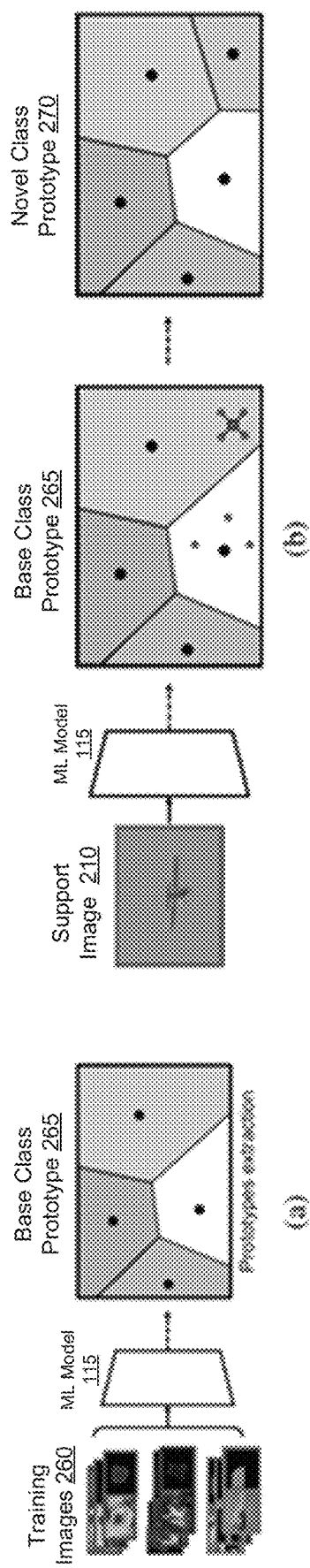
FIG. 2B depicts another schematic diagram illustrating an example of a process for weakly supervised training of a machine learning model to perform one-shot image segmentation, in accordance with some example embodiments.

To further illustrate, FIGS. 2A-B depict schematic diagrams illustrating an example of a process 200 for weakly supervised training of the machine learning model 115 to perform one-shot image segmentation, in accordance with some example embodiments. Referring to FIGS. 2A-B, the machine learning model 115 may be trained to segment one or more base objects (e.g., learn one or more base class prototypes) in a supervised manner. Accordingly, as shown in FIG. 2B, the machine learning model 115 may be trained based on a set of training images 260 each of which depicting a base object. Moreover, each of the training images 260 may be associated with pixel-wise labels corresponding to a ground-truth segmentation of the base objects depicted in the training images 260. The training images 260 may form a training set denoted as $D_{train} = \{\{I_1, M_1\}, \ldots, \{I_{N_{train}}, M_{N_{train}}\}\}$, wherein $I_{train}$ may denote a training image having the ground truth segmentation M and the value of $N_{train}$ may be assumed to be large.

Referring again to FIGS. 2A-B, once the machine learning model 115 is trained to segment the base objects (e.g., learned one or more base class prototypes) in the supervised manner, the machine learning model 115 may be deployed to perform one-shot, weakly supervised segmentation on a query image 220 depicting a novel object or a base object. As used herein, a novel object may refer to an object that is not the same as one of the base objects the machine learning model 115 encountered during the training to segment the base objects. Moreover, the machine learning model 115 may perform, based at least on a support image 210 depicting a novel object, the one-shot, weakly supervised segmentation of the query image 220. For example, as shown in FIG. 2A, the machine learning model 115 may generate, based at least on the segmentation of a class of base objects (e.g., a base class prototype) identified as being similar to the novel object, a proposed segmentation 230 of the novel object depicted in the support image 210. The machine learning model 115 may apply the proposed segmentation 230 in order to segment the query image 220 which, as noted, may depict the novel object or a base object.

The support image 210 may be part of a support set denoted as $D_{support} = \{\{I_1, C_1\}, \ldots, \{I_{N_{support}}, C_{N_{support}}\}\}$, wherein each support image $I_{support}$ may be associated with an image level label C and the value of $N_{support}$ may be relatively small, for example, compared to the value of $N_{train}$ (e.g., a single image-label pair per novel class). Each support image $I_{support}$ in the support set $D_{support}$ may depict a novel object that is not the same as the base objects depicted in the training images $I_{train}$ present in the training set $D_{train}$. Accordingly, if each image level label C∈M corresponds to a semantic class in M, then the set of semantic classes present in the training set $D_{train}$ and the support set $D_{support}$ may be disjoint (e.g., $\{C_{train}\} \cap \{C_{support}\} = \emptyset$). Moreover, it may be assumed that each support image $I_{support}$ may not depict more than one novel object and thus may not be associated with more than one label C.

Meanwhile, the query image 220 may form a query set denoted as $D_{query} = \{\{I_1\}, \ldots, \{I_{N_{query}}\}\}$. As part of the one-shot, weakly supervised segmentation of each query image $I_{query}$ included in the query set $D_{query}$, the machine learning model 115 may be tasked with obtaining a set of segmentation masks $\{M_1, \ldots, M_{N_{query}}\}$ for each query image $I_{query}$ in the query set $D_{query}$, wherein each query image $I_{query}$ in the query set $D_{query}$ depicts a novel object (e.g., novel class) defined by a corresponding support image $I_{support}$ from the support set $D_{support}$. Alternatively, in the case of generalized image segmentation, the machine learning model 115 may be tasked with segmenting each query image $I_{query}$ in the query set $D_{query}$ may be defined by either a support image $I_{support}$ from the support set $D_{support}$ or a training image $I_{train}$ from the training set $D_{train}$ such that the semantic classes present in the query set $D_{query}$ may include the semantic classes present in the support set $D_{support}$ as well as the training set $D_{train}$ (e.g., $C_{query} = C_{train} \cup C_{support}$)

When the machine learning model 115 is trained in a fully supervised manner, the machine learning model 115 may encode a support image $I_{support}$ from the support set $D_{support}$ to produce a feature map $F_s \in \mathbb{R}^{h_d \times w_s \times d}$. The binarized segmentation masks for foreground-background (FG-BG) $\{M_{S_{bg}}, M_{S_{fg}}\}$ of the support image $I_{support}$ may be used to encode the class information in the support feature map to produce a foreground feature map $F_{S_{fg}}$ and a background feature map $F_{S_{bg}}$. These feature maps may be pooled spatially to form a pooled feature map $F_{pooled} \in \mathbb{R}^{1 \times 1 \times d}$ for each of the foreground-background (FG-BG) segmentation masks. These pooled feature maps $F_{pooled}$ may be tiled and concatenated depth-wise across the feature map $F_q \in \mathbb{R}^{h_q \times w_q \times d}$ of a query image $I_{query}$ to produce a feature map $F_{qguided} \in \mathbb{R}^{h_q \times w_q \times 3d}$. The machine learning model 115 may be trained to produce, with the feature map $F_{qguided}$ serving as a proposed segmentation, a dense segmentation of the support class depicted in the query image $I_{query}$. Accordingly, the encoded features from the support image $I_{support}$ may be seen as a guide g, while the segmentation of the query image $I_{query}$ may be seen as a function $f_\theta$ parametrized by $\theta$.

However, the features from the deeper layers of the machine learning model 115 may be sufficiently generalized to perform certain classification tasks. Each high dimensional feature vector may be viewed as a bag of features. Moreover, for similar visual concepts such as similar objects, these latent representations may be clustered together. Accordingly, in some example embodiments, when the machine learning model 115 is configured to perform image segmentation in a weakly supervised manner, feature vectors for the base objects depicted in the training images $I_{train}$ (as well as background) may be extracted based on the training set $D_{train}$. Nearest neighbor classification (or another clustering technique) may be applied in order to model resemblance between a base object (e.g., a tiger) depicted in a training image $I_{train}$ to a novel object (e.g., a cat) depicted in a support image $I_{support}$.

As shown in FIGS. 2A-B, the proposed segmentation 230 of the novel object depicted in the support image 210 may be generated based on the segmentation of similar base objects (e.g., a base class prototype) learned during the training of the machine learning model 115. The proposed segmentation 230 may be used to generate the guide g for segmenting the query image 220, which may depict the same novel object as the support image 210. Alternatively and/or additionally, FIG. 2B shows that the feature space of the machine learning model 115, which may include the features extracted based on the training set $D_{train}$, may be further updated to include the features extracted based on the support set $D_{support}$. That is, the feature space of the machine learning model 115 may be updated based on the feature vectors of the novel classes depicted in the support set $D_{support}$ while preserving the clusters associated with the base classes depicted in the training set $D_{train}$. With this approach, the machine learning model 115 may be capable of performing generalized image segmentation which, as noted, may require the machine learning model 115 segments any query image $I_{query}$, including query images $I_{query}$ depicting a novel object from a support image $I_{support}$ as well as query images $I_{query}$ depicting a base object from a training image $I_{train}$.

The performance of the machine learning model 115 may be evaluated based, for example, on the PASCAL VOC dataset. The weakly supervised nearest neighbor baseline may be formed by training the machine learning model 115 on the training set $D_{train}$ while mapping all occurrences of test annotations to the background. Features may be extracted from a fully-connected layer (e.g., Fc7 layer) of the machine learning model the network in order to perform, based on Euclidean distance to the features of the base class prototypes depicted in the training set $D_{train}$, nearest neighbors classification of features of the novel classes depicted in the support set $D_{support}$. The evaluation of the machine learning model 115 may include randomly sampling, from the PASCAL VOC validation set, a query image $I_{query}$ and a support image $I_{support}$ depicting a test class $C_{test_i}$.

The performance of the machine learning model 115 performing, based on the support image $I_{support}$, one-shot, weakly supervised segmentation of the query image $I_{query}$ may be evaluated based on an intersection over union (IoU) percentage of the foreground-background (FG-BG) binary segmentation task depicted in Table 1 below. As shown in Table 1, the machine learning model 115 performing one-shot, weakly supervised image segmentation may achieve substantially the same results as a machine learning model trained to perform image segmentation in a fully supervised manner. Moreover, the performance of the machine learning model 115 exhibits improvement over the strong foreground-background (FG-BG) segmentation baseline, indicating that the conditioning features from the support set $D_{support}$ remains effective because the machine learning model 115 may be robust to the coarse pseudo segmentations obtained by the nearest neighbor classification for the support images $I_{support}$ by pooling the features from the support set $D_{support}$ spatially. As long as most features originate from the support set $D_{support}$, the guide g may remain informative about the features of various classes. Moreover, the nearest neighbor search may provide a good baseline for one-shot image segmentation including by providing an ability to isolate various objects of interest.

TABLE 1

| Supervision | Method | IoU % |
|---|---|---|
| Fully Supervised | FG-BG [17] | 55.0 |
| | Fine-Tuning [17] | 55.1 |
| | OSLSM [20] | 61.3 |
| | Co-FON [17] | 60.1 |
| | PL + SEG [3] | 61.2 |
| Weakly Supervised | Nearest neighbor baseline | 51.5 |
| | Ours (WS Co-FCN) | 58.7 |

The performance of the machine learning model 115 performing generalized image segmentation may also be evaluated based on a query image $I_{query}$ that is sampled randomly from the validation set of PASCAL VOC dataset. The support set $D_{support}$ may be generated by sampling, for example, 5 images from the PASCAL VOC validation set with each support image $I_{support}$ depicting a unique novel class. The performance of the machine learning model 115 performing generalized image segmentation may be evaluated based on an intersection over union (IoU) percentage of the foreground-background (FG-BG) binary segmentation task for 20 classes present in the PASCAL VOC dataset including, for example, base classes as well as novel classes.

Table 2 below depicts the results for one-shot segmentation over query images $I_{query}$ depicting only novel classes and query images depicting novel classes as well as base classes. According to Table. 2, the intersection over union (IoU) associated with generalized image segmentation (e.g., novel classes as well as base classes) and non-generalized image segmentation (e.g., novel classes only) may be comparable. Nevertheless, the machine learning model 115 may perform better for novel classes when the query set $D_{query}$ is limited to novel classes then when the query set is $D_{query}$ is expanded to include base classes as well.

TABLE 2

| | Mean IoU % | | | | | | | |
|---|---|---|---|---|---|---|---|---|
| | Split 1 | | Split 2 | | Split 3 | | Split 4 | |
| Setup | B | N | B | N | B | N | B | N | Mean |
| OSL | — | 16.2 | — | 32.7 | — | 21.0 | — | 25.9 | 24 |
| G-OSL | 38.3 | 5.0 | 32.9 | 9.0 | 31.9 | 13.2 | 37.8 | 6.0 | 21.7 |

Figure 3:
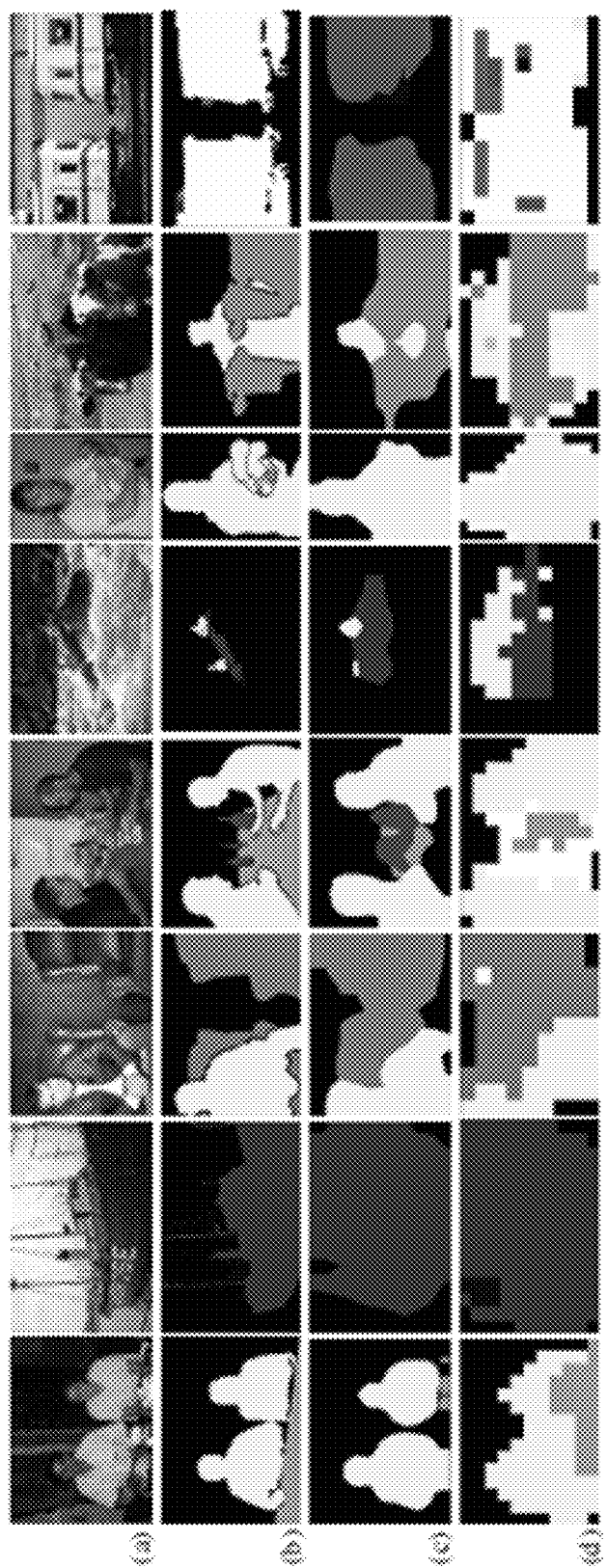
FIG. 3 depicts a qualitative result of a machine learning model performing one-shot, weakly supervised generalized image segmentation, in accordance with some example embodiments.

Qualitative results of the machine learning model 115 performing one-shot, weakly supervised generalized image segmentation are depicted in FIG. 3. FIG. 3(a) depicts test images, FIG. 3(b) depicts the ground truth segmentations associated with the test images, FIG. 3(c) depicts segmentations generated by a machine learning model trained on the base classes in a fully supervised manner, and FIG. 3(d) depicts the generalized segmentation that the machine learning model 115 generated by performing a nearest neighbor search. The last column of FIG. 3 depicts failure cases in which the segmentation of the test images fails to identify the objects depicted in the test images.

The performance of the machine learning model 115 performing one-shot, weakly supervised generalized image segmentation may also be evaluated over different support sets $D_{support}$. Table 3 below depicts the results of generalized image segmentation under two different benchmarks. In the single label case, each support image $I_{support}$ may depict only a novel classe whereas in the multi-label case, each support image $I_{support}$ may depict a novel class as well as a base class. As shown in Table 3, the presence of multi-label support images $I_{support}$ may lower the performance of the machine learning model 115 performing one-shot generalized image segmentation. This deterioration in performance may be attributable to a lower quantity of features representing a novel class and a base class in a support image $I_{support}$ that depicts both. While a reduced quantity of features may have minimal effect on the performance of the machine learning model 115 with respect to base classes, fewer features may prevent the formation of a sufficiently representative cluster center for novel classes.

TABLE 3

| | Mean IoU % | | | | | | | |
|---|---|---|---|---|---|---|---|---|
| | Split 1 | | Split 2 | | Split 3 | | Split 4 | |
| Setup | B | N | E | N | B | N | B | N | Mean |
| OSL | — | 16.2 | — | 32.7 | — | 21.0 | — | 25.9 | 24 |
| G-OSL | 38.3 | 5.0 | 32.9 | 9.0 | 31.9 | 13.2 | 37.8 | 6.0 | 21.7 |

Figure 4:
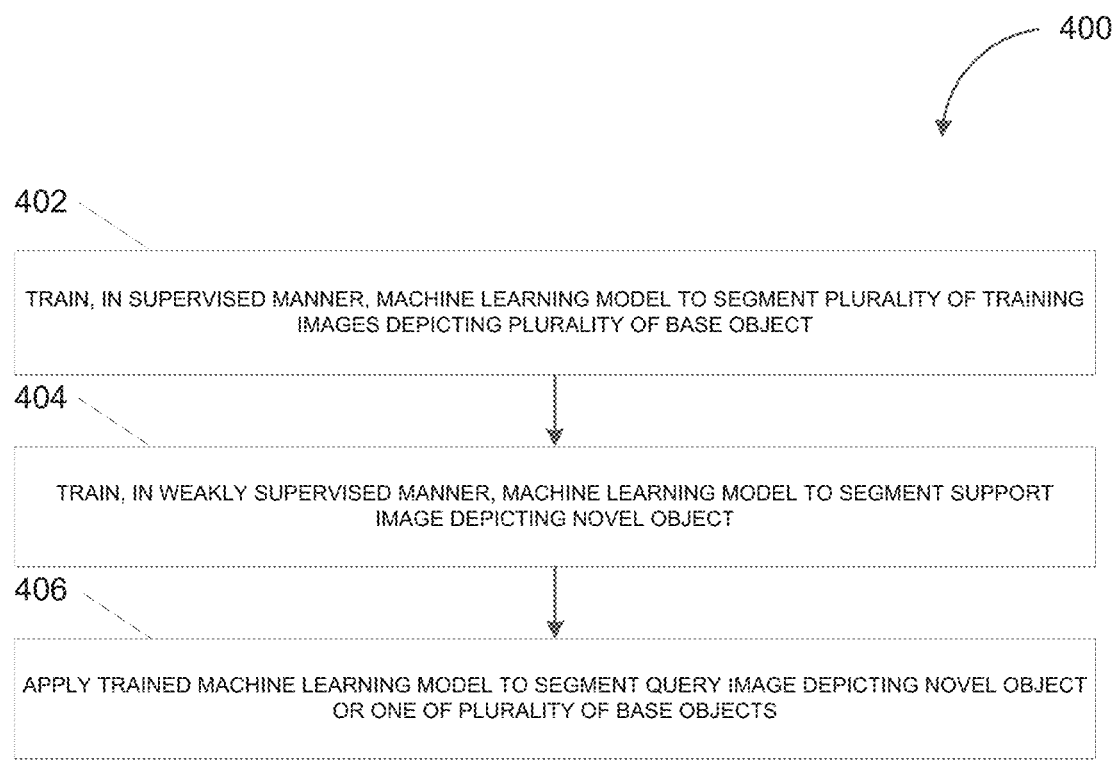
FIG. 4 depicts a flowchart illustrating an example of a process for one-shot, weakly supervised image segmentation, in accordance with some example embodiments.

FIG. 4 depicts a flowchart illustrating an example of a process 400 for one-shot, weakly supervised image segmentation, in accordance with some example embodiments. Referring to FIGS. 1, 2A-B, and 3-4, the process 400 may be performed by the image analysis engine 110 in order to segment, for example, the image 125 received from the client 120.

At 402, the image analysis engine 110 may train, in a supervised manner, the machine learning model 115 to segment a plurality of training images depicting a plurality of base objects. In some example embodiments, the image analysis engine 110 may train, based at least on the set of training images 260, the machine learning model 115 to segment one or more base objects. The machine learning model 115 may be trained to segment the base objects in a supervised manner. Accordingly, each of the training images 260 may depict a base object. Moreover, each of the training images 260 may be associated with pixel-wise labels corresponding to a ground-truth segmentation of the base objects depicted in the training images 260.

At 404, the image analysis engine 110 may train, in a weakly supervised manner, the machine learning model 115 to segment a support image depicting a novel object. In some example embodiments, once the machine learning model 115 is trained to segment the base objects, the machine learning model 115 may be deployed to perform one-shot, weakly supervised image segmentation on, for example, the query image 220. The machine learning model 115 may perform the one-shot, weakly supervised image segmentation based on the support image 210, which may depict a novel object that the machine learning model 115 did not encounter during training. For example, the machine learning model 115 may generate, based at least on the segmentation of one or more base objects identified through nearest neighbor classification, the proposed segmentation 230 of the novel object depicted in the support image 210.

At 406, the image analysis engine 110 may apply the trained machine learning model 115 to segment a query image depicting the novel object or one of the plurality of base objects. In some example embodiments, the machine learning model 115 may segment the query image 220 by at least applying the proposed segmentation 230 of the novel object depicted in the support image 210. The machine learning model 115 may perform non-generalized image segmentation, in which case the query image 220 may depict a same novel object as the support image 110. Alternatively, the machine learning model 115 may perform generalized image segmentation, in which case the query image 220 may depict the novel object depicted in the support image 110 or one of the base object encountered by the machine learning model 115 during supervised training.

Figure 5:
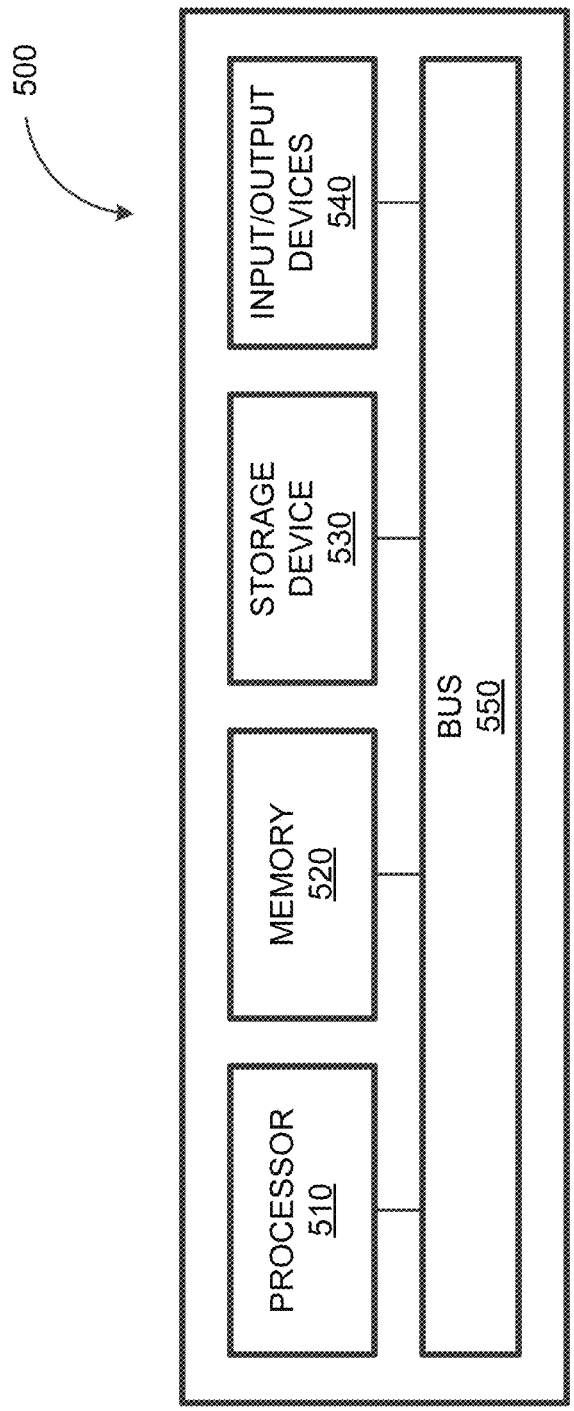
FIG. 5 depicts a block diagram illustrating a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1 and 5, the computing system 500 can be used to implement the image analysis engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the image analysis engine 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
   training, in a supervised manner, a machine learning model to learn a plurality of base class prototypes corresponding to a plurality of base objects, each of the plurality of base class prototypes corresponding to a segmentation of a class of one or more similar base objects, the machine learning model being trained based on a plurality of training images, each training image of the plurality of training images depicting a base object of the plurality of base objects, and each training image of the plurality of training images being associated with a plurality of pixel-wise labels corresponding to semantic classes indicative of a ground-truth segmentation of the base object depicted therein;
   training, based at least on a support image depicting a novel object, the machine learning model to learn a novel class prototype corresponding to the novel object, the support image being associated with an image-level label identifying the novel object depicted therein instead of a plurality of pixel-wise labels corresponding to a ground-truth segmentation of the novel object, the machine learning model being trained to learn the novel class prototype based at least on one of the plurality of base class prototypes identified as being similar to the support image, and the novel object being a different object than the plurality of base objects preserving clusters associated with the semantic classes depicted in plurality of base objects; and
   applying the trained machine learning model to segment a query image.

2. The system of claim 1, further comprising performing a nearest neighbor search in order to identify the one of the plurality of base class prototypes similar to the support image.

3. The system of claim 2, wherein the one of the plurality of base class prototypes is identified based at least on a similarity between a corresponding class of base objects and the novel object depicted in the support image.

4. The system of claim 1, wherein the query image depicts the novel object, and wherein the machine learning model segments, based at least on a proposed segmentation corresponding to the novel class prototype, the query image.

5. The system of claim 1, wherein the query image depicts one of the plurality of base objects, and wherein the machine learning model segments, based at least on a proposed segmentation corresponding to a corresponding one of the plurality of base class prototypes, the query image.

6. The system of claim 1, wherein the machine learning model comprises a neural network.

7. The system of claim 1, wherein the machine learning model is trained to learn the novel class prototype based on a single support image.

8. The system of claim 1, wherein the machine learning model segments the query image by at least assigning, to each pixel in the query image, a label indicating whether the pixel forms a portion of an object depicted in the query image.

9. A computer-implemented method, comprising:
   training, in a supervised manner, a machine learning model to learn a plurality of base class prototypes corresponding to a plurality of base objects, each of the plurality of base class prototypes corresponding to a segmentation of a class of one or more similar base objects, the machine learning model being trained based on a plurality of training images, each training image of the plurality of training images depicting a base object of the plurality of base objects, and each training image of the plurality of training images being associated with a plurality of pixel-wise labels corresponding to semantic classes indicative of a ground-truth segmentation of the base object depicted therein;
   training, based at least on a support image depicting a novel object, the machine learning model to learn a novel class prototype corresponding to the novel object, the support image being associated with an image-level label identifying the novel object depicted therein instead of a plurality of pixel-wise labels corresponding to a ground-truth segmentation of the novel object, the machine learning model being trained to learn the novel class prototype based at least on one of the plurality of base class prototypes identified as being similar to the support image, and the novel object being a different object than the plurality of base objects preserving clusters associated with the semantic classes depicted in plurality of base objects; and
   applying the trained machine learning model to segment a query image.

10. The method of claim 9, further comprising performing a nearest neighbor search in order to identify the one of the plurality of base class prototypes similar to the support image.

11. The method of claim 10, wherein the one of the plurality of base class prototypes is identified based at least on a similarity between a corresponding class of base objects and the novel object depicted in the support image.

12. The method of claim 9, wherein the query image depicts the novel object, and wherein the machine learning model segments, based at least on a proposed segmentation corresponding to the novel class prototype, the query image.

13. The method of claim 9, wherein the query image depicts one of the plurality of base objects, and wherein the machine learning model segments, based at least on a proposed segmentation corresponding to a corresponding one of the plurality of base class prototypes, the query image.

14. The method of claim 9, wherein the machine learning model comprises a neural network.

15. The method of claim 9, wherein the machine learning model is trained to learn the novel class prototype based on a single support image.

16. The method of claim 9, wherein the machine learning model segments the query image by at least assigning, to each pixel in the query image, a label indicating whether the pixel forms a portion of an object depicted in the query image.

17. A non-transitory computer readable medium storing instructions, which when executed by at least one data processor, result in operations comprising:

training, in a supervised manner, a machine learning model to learn a plurality of base class prototypes corresponding to a plurality of base objects, each of the plurality of base class prototypes corresponding to a segmentation of a class of one or more similar base objects, the machine learning model being trained based on a plurality of training images, each training image of the plurality of training images depicting a base object of the plurality of base objects, and each training image of the plurality of training images being associated with a plurality of pixel-wise labels corresponding to semantic classes indicative of a ground-truth segmentation of the base object depicted therein;

training, based at least on a support image depicting a novel object, the machine learning model to learn a novel class prototype corresponding to the novel object, the support image being associated with an image-level label identifying the novel object depicted therein instead of a plurality of pixel-wise labels corresponding to a ground-truth segmentation of the novel object, the machine learning model being trained to learn the novel class prototype based at least on one of the plurality of base class prototypes identified as being similar to the support image, and the novel object being a different object than the plurality of base objects preserving clusters associated with the semantic classes depicted in plurality of base objects; and applying the trained machine learning model to segment a query image.

\* \* \* \* \*